United States Patent [19]

Mumford et al.

[11] 3,921,504

[45] Nov. 25, 1975

[54] ADJUSTABLE STROKE INVERT DRIVE MOTOR FOR A GLASS FORMING MACHINE

[75] Inventors: Eustace H. Mumford, Ottawa Lake, Mich.; Albert W. Rieck, Waterville, Ohio

[73] Assignee: Owens-Illinois, Inc., Toledo, Ohio

[22] Filed: Sept. 27, 1973

[21] Appl. No.: 401,248

[52] U.S. Cl. .................... 92/13.4; 91/357; 91/396; 91/408; 92/13.5; 92/13.6; 92/31; 92/85
[51] Int. Cl.² .................... F01B 31/14; F15B 15/22
[58] Field of Search ............. 92/13.4, 13.6, 31, 13, 92/13.41, 13.51, 13.5, 85; 74/56

[56] References Cited
UNITED STATES PATENTS

| | | | |
|---|---|---|---|
| 1,114,132 | 10/1914 | Gehrandt | 92/31 X |
| 2,413,034 | 12/1946 | De Lancey | 92/13.6 X |
| 2,510,314 | 6/1950 | Jirsa | 92/13.6 X |
| 2,693,768 | 11/1954 | Wettley | 92/31 X |
| 2,922,397 | 1/1960 | Haanes | 92/13.6 X |
| 3,139,037 | 6/1964 | Budzich | 91/505 X |
| 3,156,160 | 11/1964 | Meyer et al. | 92/13.6 X |
| 3,270,360 | 9/1966 | Kropp | 74/56 X |
| 3,525,216 | 8/1970 | Phillips | 92/31 X |
| 3,626,807 | 12/1971 | Shartzer | 92/13.6 X |
| 3,698,288 | 10/1972 | Sonobe | 92/13.4 |

FOREIGN PATENTS OR APPLICATIONS

| | | | |
|---|---|---|---|
| 1,959,822 | 9/1970 | Germany | 92/13.6 |
| 913,189 | 12/1962 | United Kingdom | 92/13.6 |

*Primary Examiner*—Martin P. Schwadron
*Assistant Examiner*—Abraham Hershkovitz
*Attorney, Agent, or Firm*—D. T. Innis; E. J. Holler

[57] ABSTRACT

In glass forming machines in which parisons are formed in inverted position in conjunction with neck molds, the parisons are transferred from the parison molds to the blow molds by the operation of a fluid motor. The extent of travel or stroke of the fluid motor in the present invention is adjustable without the requirement of disassembling the mechanism, but by a simple turning of a single screw. The stroke of the piston or fluid motor may be adjusted within extremely close tolerances so as to permit the positioning of the neck rings at the blow mold station with greater precision than previously attainable. A pair of complementary circular wedges or plates having circumferentially tapered surfaces in facing relationship are relatively rotatable so as to separate their opposite faces to a greater or lesser extent depending upon the degree of relative rotation, while at the same time the outer faces are maintained in precise parallel relationship. The end of the travel of the piston, both in invert motion and revert motion, is cushioned by entry of a tapered portion of the piston rod or piston carrying member into recessed areas at both ends of the cylinder.

2 Claims, 8 Drawing Figures

3,921,504

ADJUSTABLE STROKE INVERT DRIVE MOTOR FOR A GLASS FORMING MACHINE

BACKGROUND OF THE INVENTION

This invention relates specifically to the neck ring invert drive system for a glass forming machine of the IS type. It has been the practice in the past to make adjustments to the stroke of the piston motor which is used to drive neck rings in their invert and revert motions by adding shims or by complicated screw arrangements. Especially critical is the final positioning of the neck rings over the blow mold at the blow station. If the neck rings are permitted to seat on the blow molds with too great a force, excessive wear will occur. If the neck rings are not permitted to come into very close relationship with the blow molds, then expanding of the glass in the blow mold may leave enlarged seams or lines in the area intermediate the neck mold and blow mold. In a normal operation of a glass forming machine of the IS type, some adjustments were capable of being made; however, they usually involved movement of one of the cylinder heads which was not of sufficient precision to assure the continued parallelism between the cylinder head surface and the piston surface. The cylinder head normally does contain an annular cylindrical passageway into which a tapered sleeve carried by the piston is moveable during the final or end of the stroke of the piston, with the inter-relationship between the tapered sleeve and the cylindrical passage serving as a cushioning means for the piston travel relative to the cylinder. When alignment of the piston and cylinder head is not maintained with precision, excessive wear would occur, cushioning would be erratic and the equipment would not perform the necessary smooth transfer of the parison. Erratic invert motion may result in the production of defective glassware.

DESCRIPTION OF PRIOR ART

The present invention is used with a glassware forming machine of the type described in Ingle U.S. Pat. No. 1,911,119, wherein FIG. 16 in particular shows the invert motor. Also, the relationship of the neck rings to the invert motor drive and piston rack equipment is shown in some detail in FIG. 5 of the Ingle patent. As is explained in the Ingle patent, adjustability of the stroke of the motor is accomplished by insertion of shims at either end of the piston travel. The present invention provides a much simpler and easy arrangement for adjustably positioning an upper adjustable cylinder head of the invert cylinder.

SUMMARY OF THE INVENTION

An adjustable stroke reciprocating piston fluid motor, wherein a cylinder and piston therein is reciprocated by the introduction of fluid under pressure to the area intermediate the end closing heads of the cylinder and piston. One end of the cylinder has an axially adjustable internal cylinder head which is adjusted by the relative rotation of a pair of tapered circular cams, one of which is carried by the adjustable head and the other is positioned between the adjustable head and the fixed head or closing head of that end of the cylinder.

While the following description will be directed specifically to the functional and structural operation of an invert drive motor for a glass forming machine, it should be kept in mind that the principles involved in the detailed mechanism to be described, have application to reciprocating piston drive motors in general.

As previously stated, the present invention has its greatest utility as a mechanical arrangement for adjusting the stroke of the reciprocating, invert drive motor for a glass forming machine of the type disclosed in U.S. Pat. No. 1,911,119.

Figure 1:
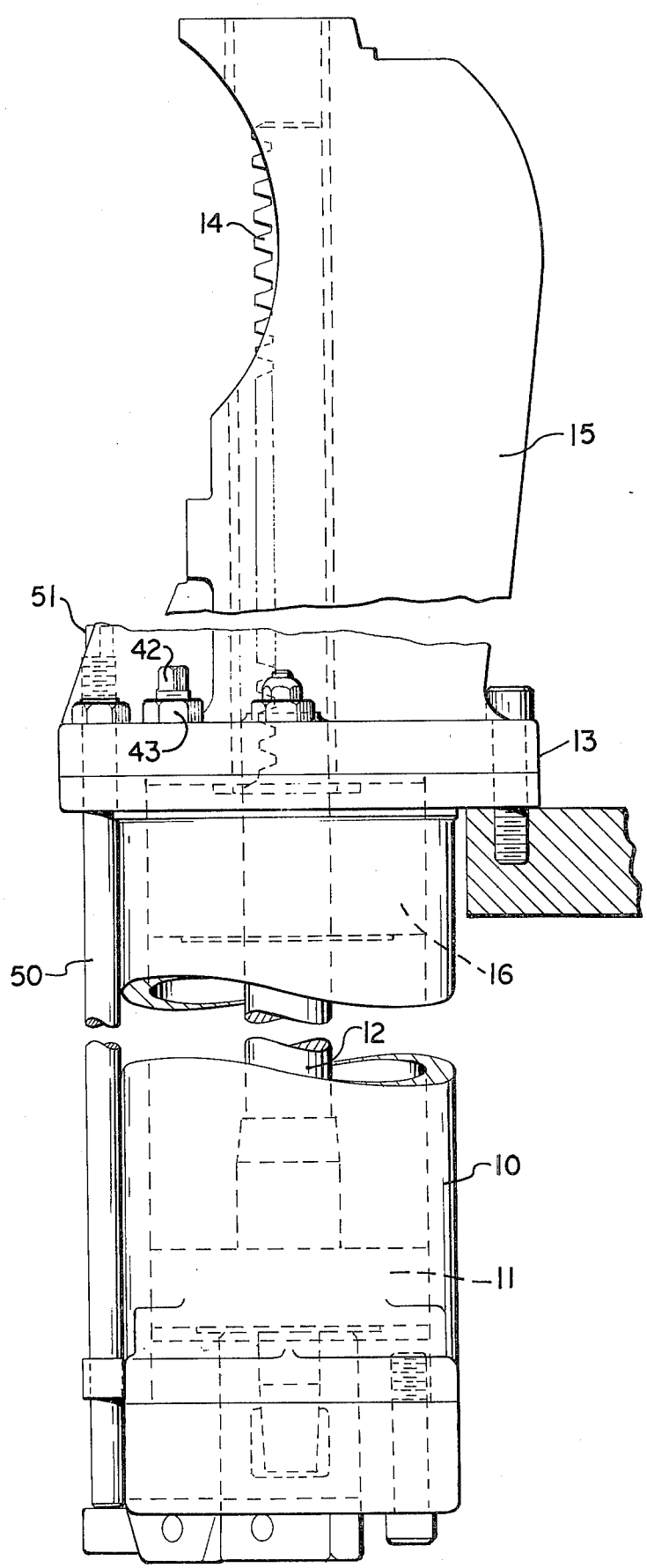
FIG. 1 is a side elevational view of fluid motor, in which a reciprocated piston rod has its upper end in the form of a rack.
Figure 2:
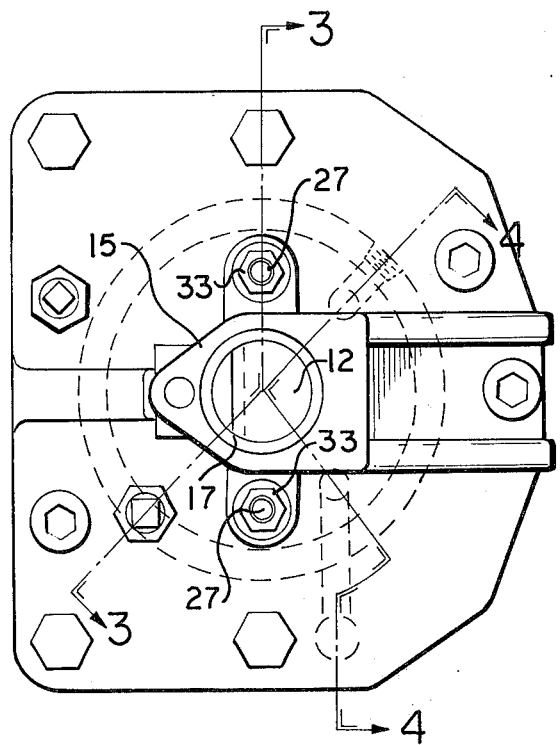
FIG. 2 is a top plan view of the motor of FIG. 1.

With particular reference to FIG. 1, the general construction and configuration of the invert drive motor will be described in detail. Basically, the motor consists of a cylinder 10 whose axial position is vertical. Within the cylinder 10 is a piston 11 having a piston rod 12 connected to the upper face thereof, which rod extends vertically through an opening in an upper, fixed head 13. The upper portion of the rod 12 is in the form of a rack 14 which normally engages a pinion (not shown) which is the member associated with the neck rings that controls the movement of the neck rings from the parison molding station to the blow molding station of an IS type machine. For a further explanation of the operation of the pinion and neck ring invert mechanism of a glass forming machine, reference may be had specifically to the abovementioned U.S. Pat. No. 1,911,119. The rack portion 14 is housed generally within and guided by a support 15 which may be integral with the head 13. Beneath the head 13 and contained within the cylinder 10, is an adjustable head 16, the details of which are best understood with reference to FIGS. 2–5.

Figure 5:
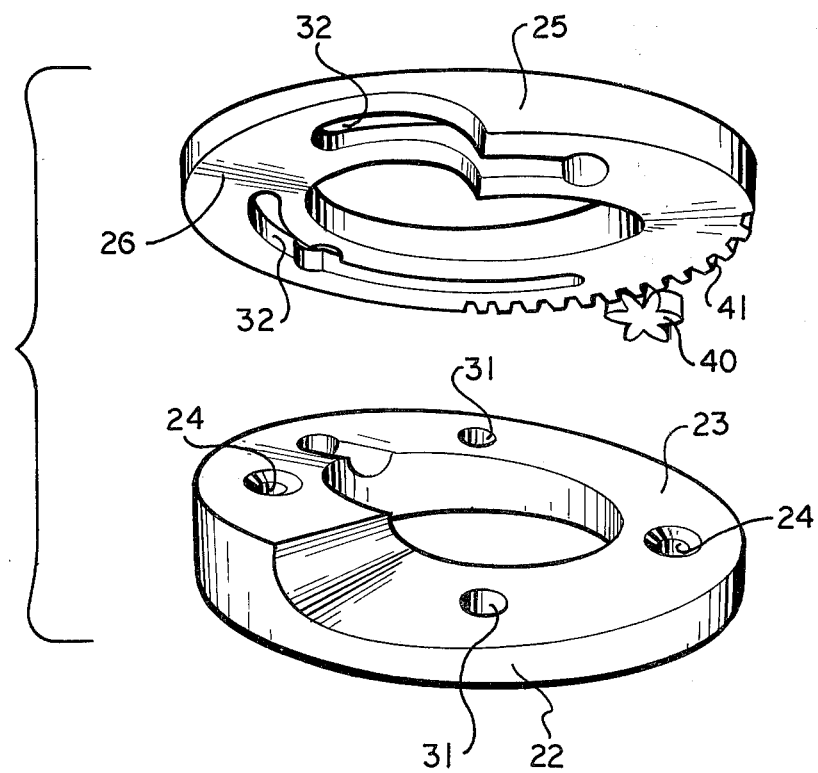
FIG. 5 is a perspective view of the two complementary cam members shown in FIGS. 3 and 4, spaced from each other for illustration purposes.
Figure 3:
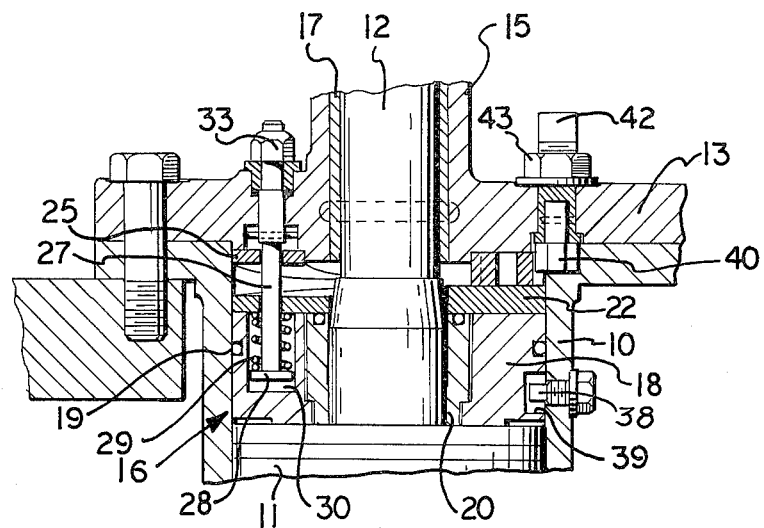
FIG. 3 is a cross-sectional view of the upper portion of the motor taken at line 3—3 of FIG. 2.
Figure 4:
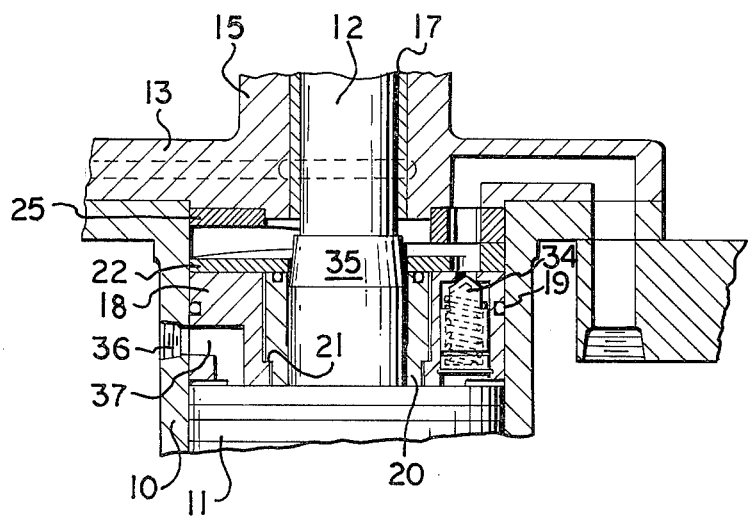
FIG. 4 is a cross-sectional view taken at line 4—4 of FIG. 2.

As can be seen when viewing FIGS. 3 and 4, the rod 12 is guided in the support by a sleeve bearing 17. The adjustable head 16 generally takes the form of an annular member 18 which is slideably positioned within the cylinder and carries an O-ring seal 19 to prevent leakage of air around the outside of the member 18. Within the annulus, formed centrally of the member 18, is a sleeve 20. The sleeve 20 is loosely retained radially with respect to the member 18 within which it is positioned and has a shoulder portion 21 which seats on a ledge formed in the recess in member 18. Again, an O-ring seal is formed at the upper annular end of the sleeve 20 for sealing engagement with respect to a first circular cam plate 22. The circular cam plate 22, as best seen in FIG. 5, has a planar lower surface and a circumferentially tapered, upper cam surface 23. The cam plate 22 is fixed to the upper surface of the annular member 18 by means of a pair of screws (not shown) which pass through the holes 24 of the cam plate 22.

A second and complementary cam plate 25, having the configuration as shown in FIG. 5, is positioned with its cam surface 26 in abutting relationship to the cam surface 23 of the cam plate 22. The upper surface of plate 25 is planar and engages the under-surface of the fixed cylinder head 13. The two cam plates 22 and 25 are held in engagement by a pair of rod-like members 27, one of which is shown in detail in FIG. 3. The lower end of the rod-like members 27 have enlarged flat heads 28 serving as the lower abutment for a compression spring 29. The head 28 is positioned within a recessed area or bore 30 formed in the annular member 18. It will be noted that the rod members 27 extend through a pair of openings 31 formed in the cam plate 22 and through a pair of circumferential slots 32 formed in plate 25. It will be readily appreciated that the plate 25 requires slots since it is the plate 25 which will be adjusted by rotation relative to the plate 22 to effect the adjustment of the head 16 relative to the cylinder head 13. The upper end of the rod 27 is provided with a threaded portion with a lock nut 33 threaded thereon for fixing the rod 27 in position in the fixed head 13. Thus it can be seen with the arrangement just described, that the annular member 18 and the plate 22 which are connected together, are biased upwardly against the plate 25 which in turn rests against the fixed head 13. The annular member 18 also contains a check valve 34 seating within the member and preventing the exhaust of fluid in the upward direction when the piston 11 is moved upward. As can readily be seen, the upward movement of the piston 11 will carry with it an enlarged tapered portion 35 which, in cooperation with the sleeve 20, serves to cushion the upward movement of the piston during the final travel of the piston relative to the adjustable head 16. As previously described, the sleeve 20 is permitted to float radially to a limited extent so as to always be in alignment with the movement of the enlarged tapered portion 35 of the piston rod 12. As the piston 11 moves upward in the cylinder 10 to the position shown in FIG. 4, air which would normally be flowing out around the rod 12, is cut off by the tapered portion 35 and air only then exhausts through a side port 36 in the cylinder 10 to an invert cushion throttle arrangement (not shown). The port 36 will always be in communication with the passage 37 in the member 18. The member 18 is prevented from rotating relative to the cylinder 10 by the rods 27 and also by a pin 38 which extends through the cylinder wall 10 into a vertical slot 39 formed in the member 18. The adjustment of the member 18 relative to the cylinder is limited to the clearance between the pin and the vertical slot 39; however, it is this small appearing adjustment which is extremely critical with regard to the proper positioning of the neck rings carried by an invert arm driven by the motor described herein.

Rotation of the cam plate 25 is effected by a pinion 40 in engagement with a circumferential rack portion 41 of the plate 25. The pinion 40 is mounted to the lower end of a shaft 42 which extends through the fixed head 13 and is provided with a square upper end for engagement with an adjusting tool. A lock nut 43, in engagement with the threaded portion of the shaft 42, will lock the shaft in any desired adjusted position. Loosening of the nut 43 will then permit turning of the shaft 42 and in turn permit rotation of the pinion 40 to effect the movement of the plate 25 relative to the plate 22.

Figure 8:
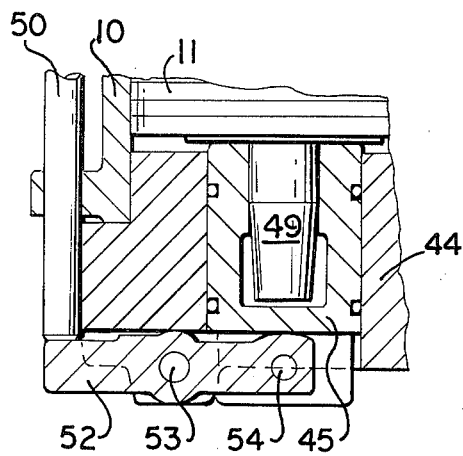
FIG. 8 is a cross-sectional view taken at line 8—8 of FIG. 6.
Figure 7:
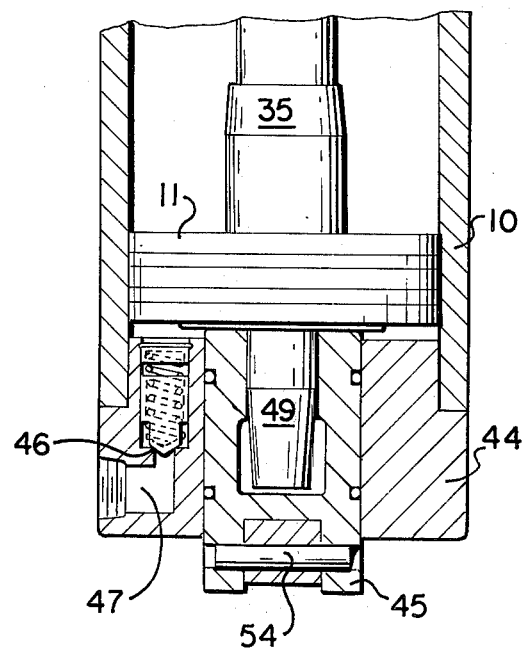
FIG. 7 is a sectional view taken at line 7—7 of FIG. 6.
Figure 6:
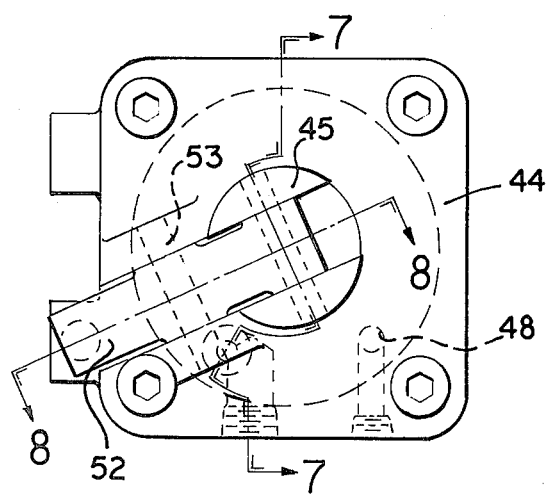
FIG. 6 is a bottom plan view of the motor of FIG. 1.

The lower end of the cylinder 10 is closed by a head 44, as best seen in FIGS. 6–8. The head 44 has a central passage extending therethrough within which is positioned a cusion cylinder 45. A pair of O-ring seals are provided between the cylinder 45 and the passage in head 44 to prevent air leakage between the two members. The head 44 also carries a check valve 46, the check valve 46 being seated in a passage 47 which in turn will be connected to the inlet of the invert air supply. A vertical passage 48 extends upwardly and opens into the interior of the cylinder 10 through the upper face of the head 44. Passage 48 is connected externally to what is termed the "revert cushion" in the form of a throttle valve (not shown). As the piston 11 travels down, in what is termed the "revert motion", a tapered plug 49 connected to the underside of the piston 11 will enter the cushion cylinder 45 and cushion the downward movement of the piston 11. The lowest position of the piston 11 may be adjusted by adjusting the position of the cushion cylinder 45. This may be done through rotation of a rod 50, whose upper end 51, as seen in FIG. 1, is threaded and may be adjusted relative to the upper head 13 by rotation. The lower end of the rod 50 is in abutting relationship with respect to a rocker arm 52 pivotally supported relative to the head 44 by the pin 53. The opposite end of the rocker arm 52 is rotatably connected to the bottom of the cushion cylinder 45 by means of a pin 54 which extends through openings formed in the cushion cylinder 45 and in the rocker arm 52. Here again the vertical adjustment of the cushion cylinder 45 is not large, but is sufficient to provide the degree of adjustment necessary to compensate for wear which will occur over a period of time and to compensate for slight manufacturing irregularities between replacement equipment which is being put into service on the forming machine from time to time.

It should be made clear that air under pressure is introduced alternately to the area at the ends of the piston 11 through the end closing head at the bottom of the cylinder by way of the check valve passage and through the check valve containing passage in the adjustable head. In alternate cycles these passages, beyond their check valves, are connected to exhaust. The cushioning at both ends of the piston movement is generally the result of the tapered members carried by the piston closing off the access to these exhaust routes.

We claim:

1. An adjustable stroke, reciprocating piston, drive motor comprising a cylinder, piston axially moveable in said cylinder, end closing heads on opposite ends of said cylinder, fluid pressure connections to said heads for moving said piston, a piston rod connected to said piston and extending through an axial opening formed in one of said end closing heads, an axially adjustable, internal, cylinder head positioned between said piston and said one of said end closing heads, a first plate of varying thickness having a planar surface that is fixed to said adjustable head and having an opposed circumferentially tapered cam surface that is in facing relationship to the one of said end closing heads, complementary circumferentially tapered cam means interposed between said one of said end closing heads and said adjustable head, means restraining said adjustable head against rotation, a fixed rod with a flat head extending through said first plate into a recess in said first plate into a recess in said adjustable head, means between said flat head and said first plate for biasing said first plate into contact with the cam, means and means for rotating said cam means relative to said first plate to effect axial displacement of said adjustable head and thereby adjust the stroke of said reciprocating piston.

2. An adjustable stroke, reciprocating piston, drive motor comprising a cylinder, a piston axially moveable in said cylinder, end closing heads on opposite ends of said cylinder, fluid pressure connections to said heads for moving said piston, a piston rod connected to said piston and extending through an axial opening formed in one of said end closing heads, an axially adjustable, internal, cylinder head positioned between said piston and said one of said end closing heads, a first plate of varying thickness having a planar surface that is fixed to said adjustable head and having an opposed circumferentially tapered cam surface that is in facing relationship to the one of said end closing heads, a second plate having a planar surface in contact with the one said fixed head and an opposed circumferentially tapered cam surface in contact with the cam surface on said first plate, said adjustable head being provided with at least two radially symmetrical cavities formed therein parallel to the axis thereof, abutment means extending through openings in said first plate and into said cavities and being fixed to the one fixed head, resilient biasing means in said cavities between said abutment means and said first plate for biasing said first plate and adjustable head in the direction of said one fixed head, pin means interposed between said adjustable head and said cylinder for preventing rotation of said adjustable head relative to said cylinder, and means for rotating said second plate relative to said cam surface on said first plate to effect axial displacement of said adjustable head and thereby adjust the stroke of said reciprocating piston.

* * * * *